United States Patent Office 2,737,502
Patented Mar. 6, 1956

2,737,502

POLYETHYLENE MODIFIED WITH ANTI-CRACK AGENT COMPRISING COPOLYMER OF VINYL CHLORIDE AND AN OCTYL ACRYLATE

William M. Land, Jr., Plainfield, N. J., and Werner T. Meyer, Jackson Heights, N. Y., assignors to Union Carbide and Carbon Corporation, a corporation of New York No Drawing. Application September 18, 1952,
Serial No. 310,356

12 Claims. (Cl. 260—23)

This invention relates to polyethylene compositions and, more particularly, to a modified polyethylene composition capable of resisting cracking when under stress in the presence of a surface-active agent.

The polyethylenes to which the present invention is directed are those obtainable as waxlike products by the polymerization of ethylene under very high pressures in the presence of or absence of oxygen as a catalyst and having molecular weights ranging from about 2,000 to 40,000 and higher (determined by a solution viscosity average molecular weight method described by Kemp and Peters, Industrial and Engineering Chemistry, volume 34, page 1097; volume 35, page 1108). Such polyethylenes are characterized by inherent flexibility, inertness to most environments, and by outstanding dielectric properties; and, because of these properties, they are particularly valuable for numerous applications. In certain applications, however, the use of polyethylene is limited, as it is subject to severe failure by cracking.

Cracking of polyethylene has been found to occur in those applications wherein it is stressed in the presence of surface-active agents which include: soaps, detergents, alcohols, polyglycol ethers, silicone fluids, and various other aliphatic and aromatic hydrocarbons. This environmental stress cracking has been reported to occur in the wire and cable industry whenever cables are lubricated with soaps or detergents prior to their being pulled through conduits. The packaging industry has also reported the failure of polyethylene or polyethylene-coated containers enclosing such surface-active compounds. In addition, piping and tubing of polyethylene will crack if in contact with a surface-active compound while under stress.

Heretofore, various expedients have been proposed to overcome environmental stress cracking. While such expedients have, in instances, been effective for this purpose, they have been found to detract from the flexibility and impact strength of polyethylene at low temperatures. Consequently, there exists a need for a means for reducing environmental stress cracking in polyethylene without appreciably affecting any of its desirable properties.

We have found that polyethylene may be made resistant to environmental stress cracking without incurring any loss in its desirable properties, by incorporating therewith small amounts of a modifier, comprising a copolymer of vinyl chloride and an octyl acrylate. Normally, the copolymer is added in amounts ranging from 2% to 10% by weight of the polyethylene. Such addition may be accomplished in any manner so long as a thorough distribution is obtained. For example, the copolymer may be milled with polyethylene resin on a two-roll mill, or if desired they may be admixed in a Banbury mixer. Improved results are obtained if the copolymer is stabilized against decomposition. This may be accomplished by adding from 0.1% to 2% by weight of the polyethylene of calcium or magnesium stearate. The stabilizer, copolymer and polyethylene may be thoroughly admixed in a manner similar to that previously described.

As indicated above, the material used according to our invention to combat environmental stress cracking of polyethylene is a copolymer of vinyl chloride and an octyl acrylate. Preferably, the acrylate ester is the 2-ethylhexyl acrylate and it is present in the copolymer in amounts varying from about 35% to about 40% by weight; the vinyl chloride being present in amounts varying from about 60% to about 65% by weight of the copolymer. In preparing the copolymer, any process may be employed wherein polymerization is carried to a relatively high conversion of monomers to copolymer. Such processes include the solvent and emulsion polymerization methods.

The polyethylene compositions may also contain, in addition to the above modifier, other additives employed to plasticize, lubricate, prevent oxidation, or lend color to the material. Such additives are well known and may be incorporated without appreciably affecting the advantageous benefits of our invention. In numerous applications carbon black, in amounts varying from .2% to 5% is often added to polyethylene for the purpose of increasing its weathering life by cutting off injurious ultraviolet light.

The resistance of polyethylene to environmental stress cracking, when modified with a copolymer of vinyl chloride and 2-ethylhexyl acrylate, was determined by subjecting stressed specimens to a surface-active environment. Specimens of modified and unmodified polyethylene, measuring 0.5 in. by 1.5 in. with a thickness of approximately 0.125 in., were punched from carefully molded sheets. A small slit was made on one side of each specimen, and the specimens were then stressed by bending them to a U-shape with the slit on the outside. While so stressed, the specimens were placed in a 5.901 in. by .709 in. (150 mm. by 18 mm.) test tube containing a surface-active agent. As the diameter of the tube was smaller than the length of the specimens, the specimens were forced to retain the U-shape and therefore remained continuously stressed. The surface-active agent employed was Igepal-CA, an alkyl aryl polyethylene glycol ether manufactured by General Dyestuff Corp. This compound was selected as it was known to produce rapid cracking of stressed polyethylene.

The table below discloses the results of the above test when conducted in a sealed tube on fifteen stressed specimens of unmodified polyethylene and on groups of fifteen stressed specimens of polyethylene containing various amounts of the copolymer modifier of our invention. As over half of the unmodified specimens failed by environmental stress cracking in one hour, it was considered that a week (168 hours) of continuous subjection to the surface-active agent would constitute an accelerated testing period sufficient to determine the crack resistance of the compositions. All of the specimens were tested at 50° C., and failure was indicated by the breaking or deep cracking of the specimen.

*Table 1*

| Resin | Modifier | Number of failures after 168 hours in surface-active environment (15 specimens tested) |
|---|---|---|
| Polyethylene | None | 15 |
| Do | 4% copolymer | 0 |
| Do | 5% copolymer | 0 |
| Do | 10% copolymer | 1 |
| Do | 5% copolymer, 0.2% calcium stearate.[1] | 0 |
| Do | 5% copolymer, 2% calcium stearate.[1] | 0 |

[1] Stabilizer for the copolymer.

In the above table the copolymer employed was the copolymer of vinyl chloride and 2-ethylhexyl acrylate containing from about 35% to about 40% by weight of the acrylate ester and from 60% to about 65% by weight of vinyl chloride. From the results of the above test, it is readily seen that polyethylene modified according to our invention is highly resistant to environmental stress cracking. The most likely cause of the one failure reported with respect to one of the specimens containing 10% of the copolymer was a too deep cutting of the slit, as failure occurred early during the test.

Those specimens containing 5% of the copolymer and those containing 5% of the stabilized copolymer were allowed to remain stressed in the presence of the surface-active agent to determine the extent of resistance to environmental stress cracking. It was found that incipient surface cracking occurred in a few of the specimens containing the unstabilized copolymer after 250 hours; however, none of them exhibited the deep sharp cracks of the unmodified specimens. In those specimens containing 5% of the stabilized copolymer, there was no evidence of cracking at the end of 336 hours (2 weeks), at which time the test was discontinued. Furthermore, there was no appreciable difference in the condition of the specimens in which the copolymer was stabilized with 0.2% or with 2% calcium stearate.

Low-temperature brittleness tests were conducted to determine the effect of the modifier on such properties of polyethylene. The test conducted and the apparatus employed are disclosed by Smith and Dienes in ASTM Bulletin, page 46, October, 1948. Briefly, the test consisted in finding the 80% nonfailure brittleness index, which is the temperature in degrees centigrade at which 80% of a group of specimens (12 out of 15) will not fail when the free end of a firmly clamped specimen is struck a sharp flexural blow. The following table contains the values found.

| Resin | Modifier | 80% Nonfailure Brittleness Index |
| --- | --- | --- |
| Polyethylene | None | Average −83° to −88° C. |
| Do | 4% copolymer | −84° C. |
| Do | 5% copolymer | −75° C. |
| Do | 7% copolymer | −78° C. |
| Do | 10% copolymer | app. −51° C. |
| Do | 5% copolymer, .2% calcium stearate. | −83° C. |
| Do | 5% copolymer, 2% calcium stearate. | −79° C. |

As may be seen from the above table, when the copolymer of vinyl chloride and 2-ethylhexyl acrylate is compounded with polyethylene to increase its resistance to environmental stress cracking, the polyethylene retains its relative freedom from brittleness at low temperatures. This indicates that the modifier of our invention does not detract from the flexbility and impact strength of polyethylene at low temperatures. The above table also indicates that when the copolymer is stabilized with calcium stearate, the good flexural properties of polyethylene at low temperatures are also retained.

It may also be desirable to include an antioxidant; such antioxidants have no material effect on the crack resistance properties of the resin and are employed to prevent degradation of the resin.

As hereinbefore disclosed, the present invention is applicable to those polyethylene resins having a molecular weight from about 2,000 to 40,000 and higher. Even though the higher-molecular-weight polyethylene resins tend to have increased crack resistance, they are significantly improved in this respect by the inclusion of our modifier.

It is sometimes impractical to employ formulations based on higher-molecular-weight resins due to their high viscosity at application temperatures. This invention makes possible the use of lower-molecular-weight, lower-viscosity resins having excellent crack resistance, where the higher-molecular-weight resins cannot be employed because of their high viscosity at such temperatures.

We claim:

1. A composition of matter comprising polyethylene and from 2% to 10% by weight of the polyethylene of a copolymer of vinyl chloride and an octyl acrylate.

2. A composition of matter comprising polyethylene and from 2% to 10% by weight of the polyethylene of a copolymer of vinyl chloride and ethylhexyl acrylate.

3. A composition of matter comprising polyethylene and from 2% to 10% by weight of the polyethylene of a copolymer of vinyl chloride and ethylhexyl acrylate, the amount of vinyl chloride in said copolymer comprising from 60% to 65% of the weight of copolymer.

4. A composition of matter comprising polyethylene, 2% to 10% by weight of the polyethylene of a copolymer of vinyl chloride and an octyl acrylate, and from about 0.1% to about 2% by weight of polyethylene of an alkaline metal stearate.

5. A composition of matter comprising polyethylene, 2% to 10% by weight of the polyethylene of a copolymer of vinyl chloride and 2-ethylhexyl acrylate, and from about 0.1% to about 2% by weight of polyethylene of calcium stearate.

6. A composition of matter comprising polyethylene and about 5% by weight of the polyethylene of a copolymer of vinyl chloride and 2-ethylhexyl acrylate.

7. A composition of matter comprising polyethylene, about 5% by weight of the polyethylene of a copolymer of vinyl chloride and 2-ethylhexyl acrylate, and 2% by weight of polyethylene of calcium stearate.

8. A composition of matter comprising polyethylene, 5% by weight of the polyethylene of a copolymer of vinyl chloride and 2-ethylhexyl acrylate, and 0.2% by weight of polyethylene of calcium stearate.

9. A composition of matter comprising polyethylene, 2% to 10% by weight of the polyethylene of a copolymer of vinyl chloride and 2-ethylhexyl acrylate, from about 2% to about 5% by weight of the polyethylene of carbon black, and from about 0.1% to about 2% by weight of the polyethylene of calcium stearate.

10. A composition of matter comprising polyethylene and from 2 to 10 percent by weight of polyethylene of a copolymer of vinyl chloride and 2-ethylhexyl acrylate, said vinyl chloride and 2-ethylhexyl acrylate being combined in said copolymer in the ratio of from about 60 to about 65 percent of vinyl chloride and from about 35 to about 40 percent of 2-ethylhexyl acrylate, by weight.

11. A composition of matter comprising polyethylene and from 2 to 10 percent by weight of polyethylene of a copolymer of vinyl chloride and 2-ethylhexyl acrylate, said vinyl chloride and 2-ethylhexyl acrylate being combined in said copolymer in the ratio of from about 60 to about 65 percent of vinyl chloride and from about 35 to about 40 percent of 2-ethylhexyl acrylate, by weight and from about 0.1 percent to about 2 percent by weight of polyethylene of calcium stearate.

12. A composition of matter comprising polyethylene and from 2 to 10 percent by weight of polyethylene of a copolymer of vinyl chloride and 2-ethylhexyl acrylate, said vinyl chloride and 2-ethylhexyl acrylate being combined in said copolymer in the ratio of from about 60 to about 65 percent of vinyl chloride and from about 35 to about 40 percent of 2-ethylhexyl acrylate, by weight, from about 2 percent to about 5 percent by weight of polyethylene of carbon black and from about 0.1 percent to about 2 percent by weight of polyethylene of calcium stearate.

References Cited in the file of this patent
FOREIGN PATENTS
985,327 France _____ July 17, 1951

OTHER REFERENCES
Heyes et al.: Abstract of patent application No. 88,223, August 8, 1950.